(12) United States Patent
Weast et al.

(10) Patent No.: US 10,163,320 B2
(45) Date of Patent: Dec. 25, 2018

(54) TECHNOLOGIES FOR DETERMINING A THREAT ASSESSMENT BASED ON FEAR RESPONSES

(71) Applicant: Intel Corporation, Santa Clara, CA (US)

(72) Inventors: John C. Weast, Portland, OR (US); Jennifer A. Healey, San Jose, CA (US); Tobias M. Kohlenberg, Portland, OR (US); Dennis M. Morgan, Pine Grove, CA (US); Brian D. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/377,444

(22) Filed: Dec. 13, 2016

(65) Prior Publication Data

US 2017/0092095 A1 Mar. 30, 2017

Related U.S. Application Data

(63) Continuation of application No. 14/583,695, filed on Dec. 27, 2014, now Pat. No. 9,547,971.

(51) Int. Cl.
*G08B 23/00* (2006.01)
*G08B 21/04* (2006.01)
(Continued)

(52) U.S. Cl.
CPC ......... *G08B 21/0423* (2013.01); *G08B 21/02* (2013.01); *G08B 21/0492* (2013.01); *G08B 29/188* (2013.01)

(58) Field of Classification Search
CPC ........ H04W 4/22; H04W 12/08; H04L 67/12; G08B 19/005; G06F 19/3493; G06F 21/552
(Continued)

(56) References Cited

U.S. PATENT DOCUMENTS

2007/0008408 A1* 1/2007 Zehavi ............. G08B 13/19613
348/143
2007/0109134 A1* 5/2007 Dugan ................ G07C 9/00111
340/573.1
(Continued)

FOREIGN PATENT DOCUMENTS

EP 2123221 11/2009
KR 10-2011-0073194 6/2011
(Continued)

OTHER PUBLICATIONS

International Search Report for PCT application No. PCT/US/2015/061609, dated Mar. 4, 2016, 3 pages.
(Continued)

*Primary Examiner* — Don N Vo
(74) *Attorney, Agent, or Firm* — Barnes & Thornburg LLP

(57) ABSTRACT

Technologies for determining a threat assessment based on fear responses comprises monitoring sensor data received from a sensor array located at a monitored site. The sensor data may include behavioral sensor data indicative of a physical behavior of individuals within the monitored site and physiological sensor data indicative of physiological characteristics of individuals within the monitored site. The threat assessment may be based on the behavioral sensor data and physiological sensor data. In some embodiments, context data related to the monitored site may be utilized analyze the behavioral sensor data and physiological sensor data and determine a threat assessment based thereon.

21 Claims, 4 Drawing Sheets

(51) Int. Cl.
*G08B 21/02* (2006.01)
*G08B 29/18* (2006.01)

(58) Field of Classification Search
USPC .................................................... 340/573.1
See application file for complete search history.

(56) References Cited

U.S. PATENT DOCUMENTS

| | | | |
|---|---|---|---|
| 2007/0287892 A1* | 12/2007 | Estrella | A61B 5/02055 600/300 |
| 2008/0271143 A1 | 10/2008 | Stephens et al. | |
| 2009/0167511 A1* | 7/2009 | Strombeck | G08B 25/08 340/425.5 |
| 2011/0227737 A1 | 9/2011 | Kamins | |
| 2012/0191425 A1 | 7/2012 | Mott | |
| 2012/0290266 A1 | 11/2012 | Jain | |
| 2014/0118144 A1* | 5/2014 | Amis | G08B 21/02 340/540 |
| 2014/0347479 A1 | 11/2014 | Givon | |
| 2015/0312651 A1* | 10/2015 | Zhuang | H04N 7/181 348/143 |
| 2016/0019813 A1 | 1/2016 | Mullen | |
| 2016/0203699 A1* | 7/2016 | Mulhern | G06F 19/327 340/573.1 |

FOREIGN PATENT DOCUMENTS

| | | |
|---|---|---|
| WO | 2006/102538 | 9/2006 |
| WO | 2007/033194 | 3/2007 |
| WO | 2010/120945 | 10/2010 |

OTHER PUBLICATIONS

Written Opinion for PCT application No. PCT/US/2015/061609, dated Mar. 4, 2016, 7 pages.
Partial Supplementary European Search Report in European Application No. 15873934.2, dated Dec. 7, 2018 (11 pages).

* cited by examiner

TECHNOLOGIES FOR DETERMINING A THREAT ASSESSMENT BASED ON FEAR RESPONSES

CROSS-REFERENCE TO RELATED APPLICATION

The present application is a continuation application of U.S. application Ser. No. 14/583,695, entitled "TECHNOLOGIES FOR DETERMINING A THREAT ASSESSMENT BASED ON FEAR RESPONSES," which was filed on Dec. 27, 2014.

BACKGROUND

Due to the increasing size of public events, the increasing mobility of the common person, and other factors, it is becoming more difficult to detect public security events or threats. Although some locations are heavily monitored with multiple threat detection systems, oftentimes the multiple threat detection systems are unconnected from each other or otherwise not in direct communication. Additionally, other locations may have smaller or no threat detection systems in place.

Many typical threat detection systems are reactionary systems that depend upon an exposed or current threat (e.g., after the threat has realized) or based on past behavior of specifically monitored individuals (e.g., purchasing patterns, online activity, etc.). In this way, a typical threat detection system measures static behavior, often focused on a single person or small group of identified people. As such, typical threat detection and security systems are unable to predict or infer a threat condition based on real-time data.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
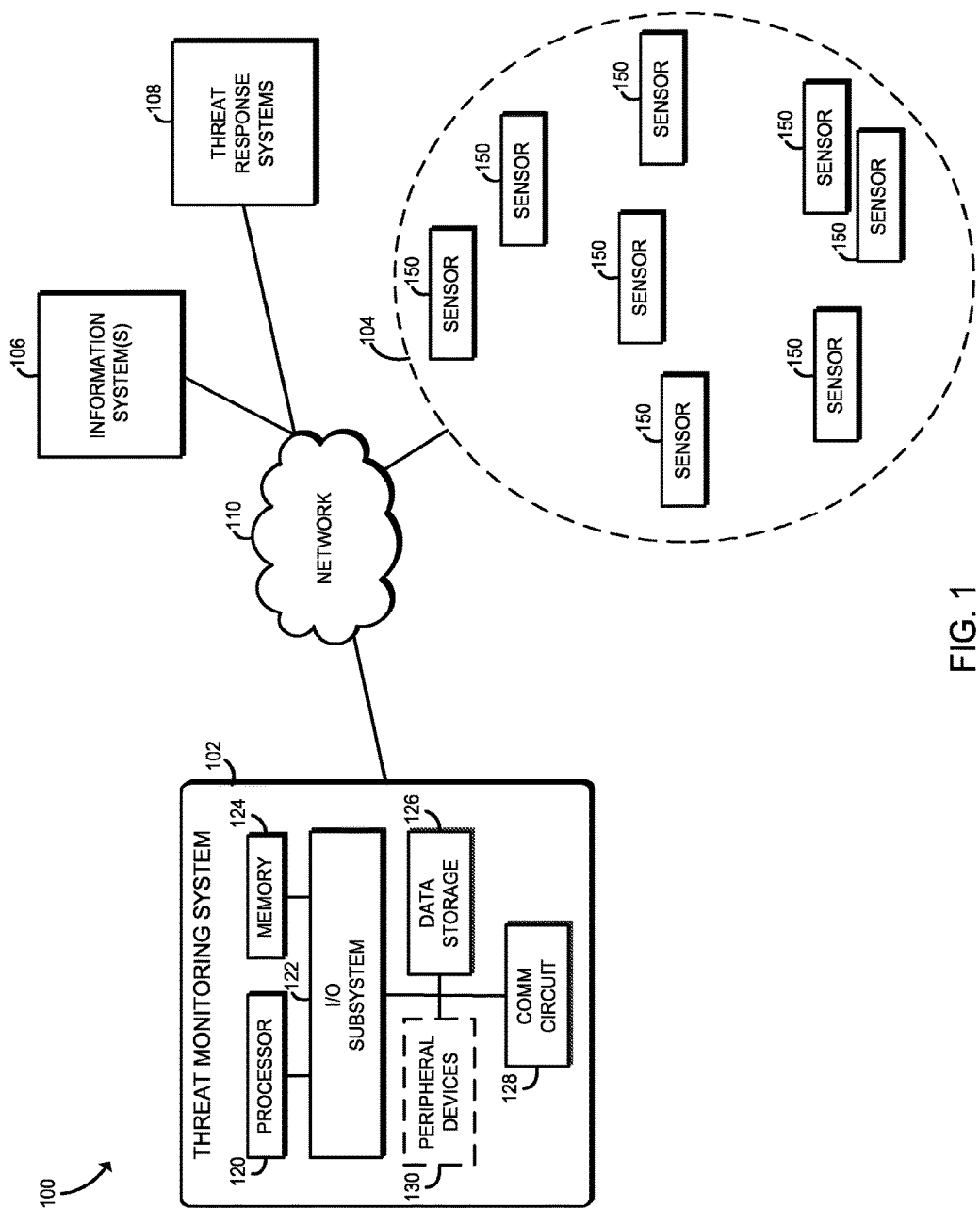
FIG. 1 is a simplified block diagram of at least one embodiment of a system for determining a threat assessment based on fear responses of monitored individuals.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for determining a threat assessment at a monitored site includes a threat monitoring system 102 and one or more sensor arrays 104 located at the monitored site. As discussed in more detail below, the threat monitoring system 102 is configured to determine a threat assessment for a monitored site based on an analysis of sensor data indicative of fear responses of individuals located at the monitored site. To do so, the threat monitoring system 102 analyzes sensor data generated by one or more sensors 150 of the sensor array 104. As discussed in more detail below, the sensors 150 may be embodied as a diverse collection of sensors including permanent security sensors, personal or company monitoring sensors, individual sensors, and/or other sensors located at the monitored location. The sensor data generated by the sensor array 104 may include any type of data useful to the threat monitoring system 102 in determining the presence of a threat. For example, the sensor data may include behavioral sensor data, which may be indicative of fear responses of individuals at a monitored site, and physiological sensor data, which may be indicative of actual fear felt by the individuals at the monitored site.

To determine a threat assessment of a monitored location, the threat monitoring system 102 analyzes the behavior sensor data to determine the physical behaviors of individuals located at the monitored site (e.g., are the individuals running away from a common location) and the physiological sensor data to determine physiological characteristics of the individuals located at the monitored site (e.g., increase heart rate, sweating, release of adrenalin, galvanic skin response, etc.). In this way, the threat monitoring system 102 monitors for abnormal behavior and physiological responses to determine the possibility of a threat. Of course, some typically abnormal behavior may be normal under some conditions. For example, while a group of people running in unison may be suspicious with no context, such a behavior may be expected if the group is headed toward a public transit about to leave the station. As such, to improve the accuracy of the threat assessment, the threat monitoring system 102 also retrieves or determines context data related to the monitored site and adjusts the analysis of the behavior sensor data and physiological sensor data based on the associated context data. As discussed in more detail below, the context data may be embodied as any type of data that may provide insight or explanation of behaviors and response of individuals located at the monitored site (e.g., cultural context, temporal context, etc.). To obtain the context data, the threat monitoring system 102 may access one or more information systems 106 over a network 110. As discussed in more detail below, the information systems 106 may be embodied as any type of source from context information may be obtained.

If the threat monitoring system 102 determines, based on the sensor data, that a threat is occurring or likely occurring, the threat monitoring system 102 may activate one or more threat response systems 108. The threat response systems 108 may be embodied as any type of system useful in responding to the threat, such as emergency response systems, as discussed in more detail below.

The threat monitoring system 102 may be embodied as any type of computer system capable of determining a threat assessment based on the sensor data from the sensor array 104 and performing the other functions described herein. For example, the threat monitoring system 102 may be embodied as a server, a computer, a multiprocessor system, a processor-based system, a desktop computer, a tablet computer, a notebook computer, a laptop computer, or any other computing device capable of generating a threat assessment as described herein. Although the threat monitoring system 102 is illustratively shown in FIG. 1 as single computing device, it should be appreciated that the threat monitoring system 102 may be embodied as a distributed computing system, a virtual computing system, a cloud service, a collection of computers or computing systems, or otherwise have a distributed architecture.

As shown in FIG. 1, the threat monitoring system 102 includes a processor 120, an I/O subsystem 122, a memory 124, a data storage 126, and a communication circuit 128. Of course, the threat monitoring system 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the threat monitoring system 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the threat monitoring system 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the threat monitoring system 102, on a single integrated circuit chip.

The data storage 126 may be embodied as any type of device or devices configured for the short-term or long-term storage of data. For example, the data storage 126 may include any one or more memory devices and circuits, memory cards, hard disk drives, solid-state drives, or other data storage devices.

The communication circuit 128 may be embodied as any communication circuit, device, or collection thereof, capable of enabling communications between the threat monitoring system 102 and the information systems 106 and threat response systems 108. To do so, the communication circuit 128 may be configured to use any one or more communication technology and associated protocols (e.g., Ethernet, Bluetooth®, Wi-Fi®, WiMAX, etc.) to effect such communication.

In some embodiments, the threat monitoring system 102 may further include one or more peripheral devices 130. Such peripheral devices 130 may include any type of peripheral device commonly found in a server or computer device, for example, a hardware keyboard, input/output devices, peripheral communication devices, and/or other peripheral devices.

The sensor array 104 may include any number of individual sensors 150. As discussed above, some of the sensors 150 may be pre-established threat assessment sensors such as stationary or mobile cameras, motion sensors, chemical sensors, or the like. Additionally, some of the sensors 150 may be "commandeered" sensors of a third-party. For example, the threat monitoring system 102 may utilize a camera located at a retail establishment located within the monitored site, a glass breakage sensor located at a bank within the monitored site, a traffic sensor, vehicle cameras and sensors, communication sensors, and/or the like. Further, some of the sensors 150 may be personal sensors carried by individuals located within the monitored site. For example, the sensors 150 may be embodied as, or otherwise include, head-mounted cameras, smart glasses, biometric sensors, heart-rate sensors, audio sensor, motion sensor, proximity sensor, pedometer, breathing sensors, or any other sensor capable of generating physiological or behavioral sensor data of the wearer. Of course, due to privacy concerns, the sharing of such personal data to the threat monitoring system 102 may opted into or anonymized. It should be appreciated that the sensor array 104 may include any number of sensors 150. Additionally, the collection of sensors 150 defining the sensor array 104 may change over time as sensors become available or are removed from the monitored site.

Each information system 106 may be embodied as any type of computer information system with which the threat monitoring system 102 may communicate to determine context data about the monitored site. For example, if the monitored site is a subway station, the threat monitoring system 102 may communicate with an information system having the schedule of subway comings and goings.

Similarly, the threat response systems 108 may be embodied as any type of system, collection of devices, services, entities, or other resources which the threat monitoring system 102 may employ to respond to or mitigate a perceived threat. For example, the threat response systems 108 may include emergency responders (police, firemen, and medical personnel), traffic control systems, public notification or address systems, and/or other services, systems, or devices useful in responding to a threat.

As discussed above, the threat monitoring system 102 may communicate with the information systems 106 and the threat response systems 108 over the network 110. The network 110 may be embodied as any type of communication network capable of facilitating such communication. As such, the network 110 may include one or more networks, routers, switches, computers, and/or other intervening devices. For example, the network 110 may be embodied as or otherwise include one or more local or wide area networks, cellular networks, publicly available global networks (e.g., the Internet), an ad hoc network, a short-range communication network or link, or any combination thereof.

Figure 2:
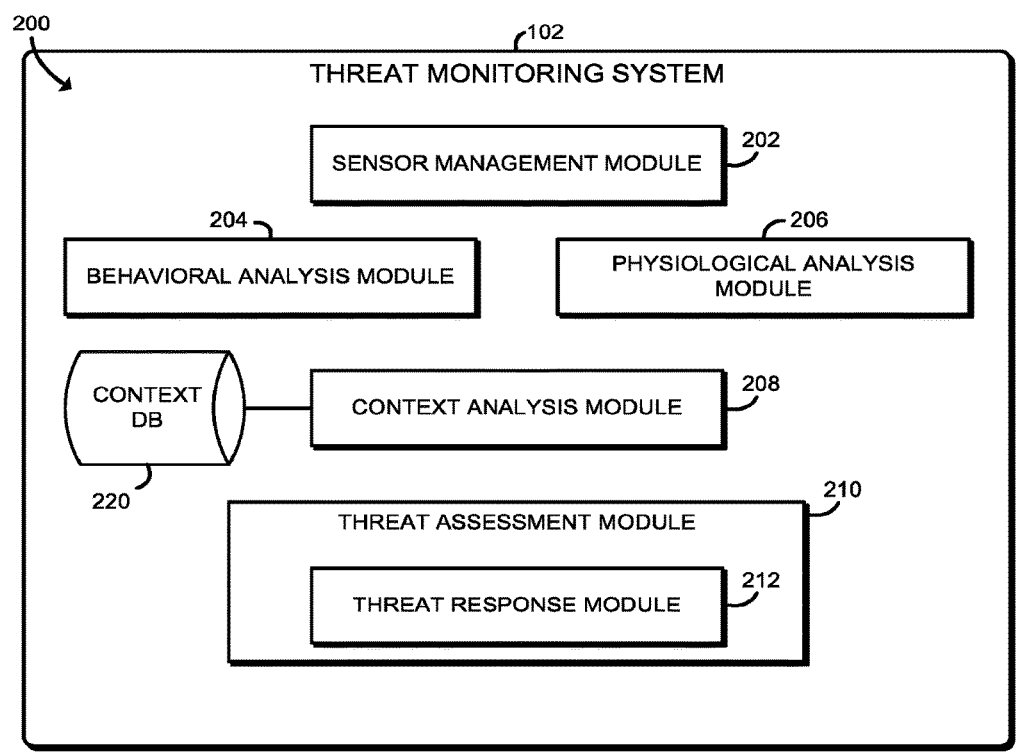
FIG. 2 is a simplified block diagram of at least one embodiment of an environment that may be established by a threat monitoring system of the system of FIG. 1.

Referring now to FIG. 2, in use the threat monitoring system 102 may establish an environment 200. The illustrative environment 200 includes a sensor management module 202, a behavioral analysis module 204, a physiological analysis module 206, a context analysis module 208, and a threat assessment module 210. Each of the modules and other components of the environment 200 may be embodied as firmware, software, hardware, or a combination thereof. For example the various modules, logic, and other components of the environment 200 may form a portion of, or otherwise be established by, the processor 120, the I/O subsystem 122, an SoC, or other hardware components of the threat monitoring system 102'. As such, in some embodiments, any one or more of the modules of the environment 200 may be embodied as a circuit or collection of electrical devices (e.g., a sensor management circuit, a behavioral analysis circuit, a physiological analysis circuit, a context analysis circuit, and a threat assessment circuit, etc.).

The sensor management module 202 is configured to obtain sensor data from the sensor array 104. To do so, in some embodiments, the sensor management module 202 may select sensors 150 for inclusion in the sensor array 104 and communicate with those sensors 150 to obtain the relevant sensor data. For example, in embodiments in which individuals within the monitored site are wearing personal sensors 150, the sensor management module 202 may establish a connection with those personal sensors 150 or otherwise retrieve sensor data from the personal sensors 150. In some embodiments, the sensor management module 202 may differentiate the sensor data. For example, the sensor management module 202 may provide behavioral sensor data to the behavioral analysis module 204 and physiological sensor data to the physiological analysis module 206.

The behavioral analysis module 204 is configured to analyze behavioral data from the sensor data received from the sensor array 104. In the illustrative embodiment, the behavioral analysis module 204 analyzes the behavioral data indicative of physical behavior of individuals in the monitored site. For example, the behavioral analysis module 204 may monitor the behavioral sensor data to identify abnormal physical behavior. To do so, the behavioral analysis module 204 may compare the physical behavior of monitored individuals to the physical behavior of other individuals at the monitored location and/or expected physical behavior. For example, the behavioral analysis module 204 may identify individuals moving against the flow of a crowd, individuals wearing abnormal clothing, individuals in a crowd giving wide breadth to a specific individual, herd-like crowd behavior, or any other physical behavior of individuals located within the monitored site.

The physiological analysis module 206 is configured to analyze physiological data from the sensor data received from the sensor array 104. In the illustrative embodiment, the physiological analysis module 206 analyzes the physiological data indicative of physiological characteristics of individuals in the monitored site. For example, the physiological analysis module 206 may monitor the physiological sensor data to identify abnormal physiological characteristics. To do so, the physiological analysis module 206 may compare the physiological characteristics to normal or expected baseline (e.g., is the individuals heart rate elevated).

As discussed above, in some embodiments, the analysis of the behavioral sensor data and the physiological sensor data is tempered or adjusted based on context data associated with the monitored site. To do so, the context analysis module 208 is configured to obtain context data for the monitored site and analyze the context data for relevancy to the behavioral and physiological analysis. In some embodiments, the threat monitoring system 102 may store context data locally in a context database 220. Such context data may include, for example, static context data about the monitored site. In other embodiments, the context analysis module 208 may retrieve context data from one or more of the information systems 106. As discussed above, the context data may be embodied as any type of data usable by the threat monitoring system to determine a context for the monitored site. For example, the context data may be embodied as cultural context data related to a culture of the individuals located within the monitored site (e.g., data defining customary personal distances), event or activity data, (e.g., data identifying an event or an activity occurring at the monitored area), temporal data (e.g., data identifying train schedules or large business closings, data related to the time of day or time of year), seasonal data (e.g. data identifying expected populations based on season), past/historical behavior for particular individuals in similar circumstances, or the like.

The context analysis module 208 may analyze the identified context data to better understand or explain monitored behavior and/or physiological characteristics. For example, the context analysis module 208 may analyze pedestrian traffic patterns based on train or bus schedules, crowd swelling based on rush hour timing, erratic behavior based on holidays or weekends, and/or perform other analyses on the context data to improve the analysis or understanding of the behavioral and/or physiological data.

The threat assessment module 210 is configured to determine a threat assessment based on the behavioral analysis, the physiological analysis, and the context analysis. To do so, the threat assessment module 210 may use any suitable algorithm or methodology to determine the threat assessment. For example, a presence of fear-like behavior in the behavioral sensor data coupled with a presence of fear-like response in the physiological sensor data may be indicative of an active threat (barring contextual reasons to explain such data).

Additionally, in some embodiments, the threat assessment module 210 may classify the fear-based event based on size, location, and/or intensity as determined by the monitored behavior and physiological data. Such classification may be used in the determination of the appropriate threat response, which is handled by a threat response module 212 of the threat assessment module 210. To do so, the threat response module 212 may communicate with the various threat response systems 108 to activate those systems in response to an active threat. For example, the threat response module 212 may notify emergency response systems, control traffic systems, notify individuals via personalized communication, generate public notifications, refocus the threat monitoring efforts, or perform some other action in response to a determination of a threat.

Figure 3:
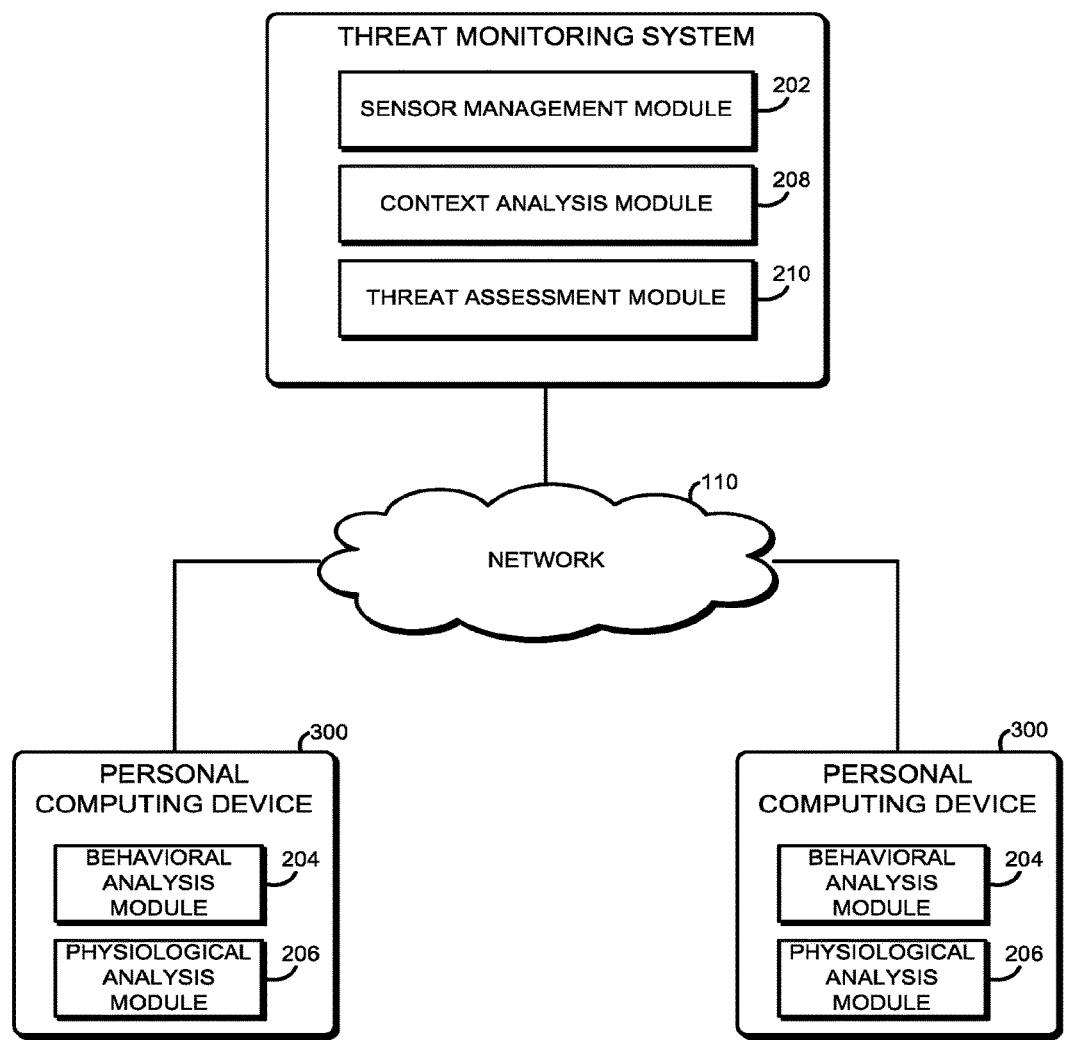
FIG. 3 is a simplified block diagram of at least one embodiment of various environments that may be established by devices of the system of FIG. 1.

Referring now to FIG. 3, as discussed above, some of the sensors 150 of the sensor array 104 may be embodied as personal sensors 150 carried by individuals located within the monitored site. In some embodiments, those personal sensors 150 may be embodied as sensors of personal computing device 300 carried by individuals. The personal computing devices 300 may be embodied as any type of computing device such as a medical monitoring device, a biometric monitoring device, smart glasses, smart phone, smart watch or accessory, tablet computer, or other computing device. In such embodiments, some of the personal computing device 300 may include local behavioral analysis modules 204 and/or local physiological analysis modules 206, which may be configured to analyze behavioral and physiological sensor data generated by a personal sensor 150 of the computing device 300 or other personal devices of the individual. In such embodiments, the personal computing devices 300 may transmit the behavioral analysis data and/or the physiological analysis data to the threat monitoring system, wherein the analysis data is analyzed by the threat assessment module 210 to determine a threat assessment. Alternatively, the behavioral analysis data and/or the physiological analysis data may be analyzed locally on the personal computing device 300. It should be appreciated by incorporating the behavioral analysis and physiological analysis into the individual's personal computing devices 300, the individual is provided with an increased level of anonymity and privacy.

Figure 4:
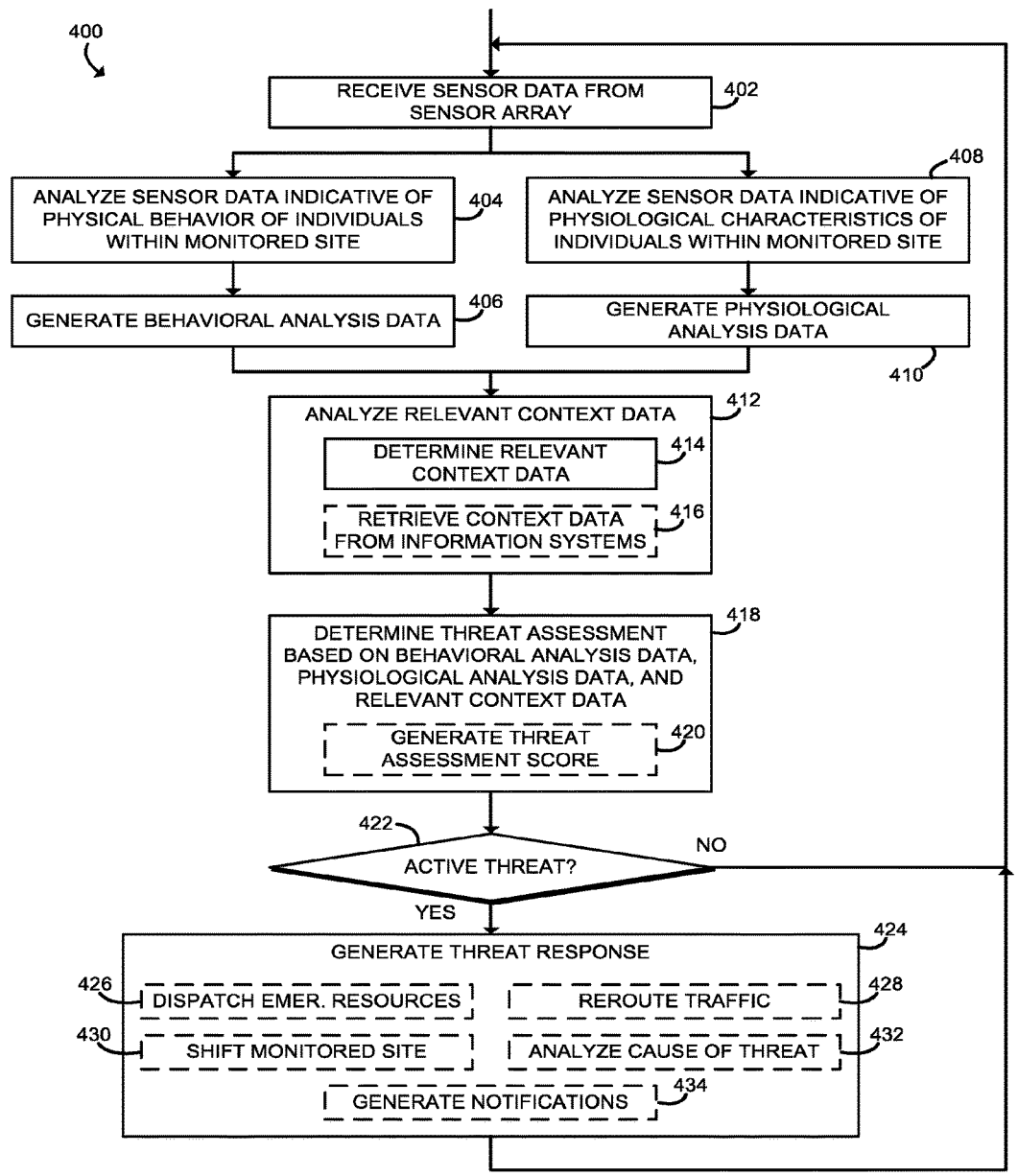
FIG. 4 is a simplified block diagram of at least one method for determining a threat assessment that may be executed by the threat monitoring system of FIGS. 1-3.

Referring now to FIG. 4, in use, the threat monitoring system 102 may execute a method 400 for determining a threat assessment. The method 400 begins with block 402 in which the threat monitoring system 102 receives sensor data from the sensors 150 of the sensor array 104 located at the monitored site. As discussed above, the sensor data may include behavioral sensor data and physiological sensor data. As such, the method 400 branches to blocks 404 and 408 in which the behavioral sensor data and physiological sensor data is analyzed. In block 404, the threat monitoring system 102 analyzes the behavioral sensor data indicative of a physical behavior of individuals within the monitored site and generates behavioral analysis data in block 406. As discussed above, the threat monitoring system 102 may utilize any suitable algorithm or methodology to analyze the behavioral sensor data. In the illustrative embodiment, the threat monitoring system 102 analyzes the behavior sensor data to determine abnormal physical behavior of individuals located within the monitored site. To do so, the threat monitoring system 102 may compare the physical behavior of monitored individuals to the physical behavior of other individuals at the monitored location and/or expected physical behavior. The generated behavioral analysis data may be indicative of the determined abnormal behavior.

In block 408, the threat monitoring system 102 analyzes the physiological sensor data indicative of physiological characteristics of individuals within the monitored site and generates physiological analysis data in block 410. Again, the threat monitoring system 102 may utilize any suitable algorithm or methodology to analyze the physiological sensor data. In the illustrative embodiment, the threat monitoring system 102 analyzes the physiological sensor data to determine abnormal physiological characteristics of individuals located within the monitored site. To do so, the threat monitoring system 102 may compare the physiological characteristics to normal or expected baseline values.

Subsequently, in block 412, the threat monitoring system 102 analyzes context data relevant to the monitored area. To do so, in block 414, the threat monitoring system 102 determines the relevant context data for the monitored area. As discussed above, the threat monitoring system 102 may store context data in the context database 220 and retrieve context relevant to the monitored area. The threat monitoring system 102 may use any suitable algorithm or process to determine which context data is relevant to the monitored site. In some embodiments, context data (e.g., temporal context data) may be relevant at different times and/or under different conditions, while other context data (e.g., cultural) may be relevant at all times and under all conditions. Additionally, as discussed above, the threat monitoring system 102 may be configured to contact information systems 106 to retrieve context data in block 416.

In block 418, the threat monitoring system 102 determines a threat assessment for the monitored site based on the behavioral analysis data generated in block 406, the physiological analysis data generated in block 410, and the relevant context data determined in block 412. Again, as discussed above, the threat assessment module 210 may use any suitable algorithm or methodology to determine the threat assessment based on such factors. In some embodiments, the threat monitoring system 102 generates a threat assessment score in block 420. The threat assessment score may be used by the threat monitoring system 102 to determine whether an active threat is present (e.g., by providing a measureable scale against which to judge the current analysis), as well as a measure of accountability for the undertaking of response actions, or lack thereof.

In block 422, the threat monitoring system 102 determines whether there is an active threat based on the threat assessment determined in block 418 (e.g., based on the threat score determined in block 420). If not, the method 400 loops back to block 402 in which the threat monitoring system 102 continues to monitor the sensor data generated by the sensor array 104. However, if the threat monitoring system 102 determines that there is an active threat, the method 400 advances to block 424 in which the threat monitoring system 102 generates a threat response. For example, in block 426, the threat monitoring system 102 may communicate with the threat response systems 108 to dispatch emergency resources to the monitored site. In block 428, the threat monitoring system 102 communicate with the threat response systems 108 to reroute traffic away from the monitored site. In block 430, the threat monitoring system 102 may refocus or shift the location of the monitored site (e.g., the threat monitoring system 102 may determine the actual threat is located at a different location or that the active threat has relocated). Additionally, in block 432, the threat monitoring system 102 may attempt to analyze the cause the threat based on the sensor data obtained from the sensor array 104. For example the threat monitoring system 102 may attempt to determine the scale of the threat, the number of actors involved, the ongoing threat level, and/or any other data useful in responding to the threat. Further, in block 434, the threat monitoring system 102 may generate alert notifications. As discussed above, the threat monitoring system 102 may generate public notifications displayed or generated on public warning systems or display, as well as personal notifications sent to personal computing devices or groups of individuals. For example, in some embodiments, the threat monitoring system 102 may generate the notifications within the monitored area to provide some information to non-participant individuals within the monitored area. Further, the threat monitoring system 102 may contact specific people to garner more information.

After the threat monitoring system 102 has responded to the active threat, the method 400 loops back to block 402 in which the threat monitoring system 102 continues monitoring the sensor data produced by the sensor array 104. In this way, the threat monitoring system 102 analyzes fear-like behavior and responses to determine the likelihood of a threat within a monitored site and adjusts such analysis based on the context of the monitored site.

Although the method 400 has been described above in regard to a single sensor array 104 and associated monitored site, it should be appreciated that the threat monitoring system 102 may analyze sensor data from many sensor arrays 104 in parallel. For example, in some embodiments, the conditions of one monitored site, as indicated by the sensor data, may affect the analysis of sensor data generated at another monitored site.

EXAMPLES

Illustrative examples of the devices, systems, and methods disclosed herein are provided below. An embodiment of the devices, systems, and methods may include any one or more, and any combination of, the examples described below.

Example 1 includes a threat monitoring system for determining a threat assessment at a monitored site, the threat monitoring system comprising a sensor management module to receive sensor data from sensors of a sensor array located at the monitored site, the sensor data including behavioral sensor data indicative of a physical behavior of individuals within the monitored site and physiological sensor data indicative of physiological characteristics of individuals within the monitored site; a behavioral analysis module to analyze the behavioral sensor data to generate behavioral analysis data; a physiological analysis module to analyze the physiological data of the sensor data to generate physiological analysis data; and a threat assessment module to determine a threat assessment for the monitored site based on the behavioral analysis data and the physiological analysis data.

Example 2 includes the subject matter of Example 1, and further comprising a context analysis module to determine context data related to the monitored site, wherein to determine the threat assessment comprises to determine a threat assessment for the monitored site based on the behavioral analysis data, the physiological analysis data, and the context data.

Example 3 includes the subject matter of any of Examples 1 and 2, and wherein the context data comprises context data related to a culture of the individuals located within the monitored site.

Example 4 includes the subject matter of any of Examples 1-3, and wherein the context data comprises context data related to an event held at the monitored site, an activity performed at the monitored site, the time of day, or the time of year.

Example 5 includes the subject matter of any of Examples 1-4, and wherein to determine context data comprises to receive context data from a remote information system.

Example 6 includes the subject matter of any of Examples 1-5, and wherein to analyze the behavioral sensor data comprises to analyze the behavioral sensor data based on the context data to generate the behavioral analysis data.

Example 7 includes the subject matter of any of Examples 1-6, and wherein to analyze the physiological sensor data comprises to analyze the physiological sensor data based on the context data to generate the physiological analysis data.

Example 8 includes the subject matter of any of Examples 1-7, and wherein to analyze the behavioral sensor data comprises to compare a physical behavior of an individual located within the monitored site to other individuals located within the monitored site to detect abnormal physical behavior.

Example 9 includes the subject matter of any of Examples 1-8, and wherein to detect the abnormal physical behavior comprises to detect the wearing of abnormal clothing by the individual relative to the clothing worn by the other individuals located within the monitored site.

Example 10 includes the subject matter of any of Examples 1-9, and wherein to detect the abnormal physical behavior comprises to detect an abnormal physical proximity of the individual to another individual within the monitored site relative to proximities of other individuals with each other.

Example 11 includes the subject matter of any of Examples 1-10, and wherein to detect the abnormal physical behavior comprises to detect an abnormal movement of the individual relative to the movement of the other individuals located within the monitored site.

Example 12 includes the subject matter of any of Examples 1-11, and wherein to analyze the physiological sensor data comprises to compare a physiological characteristic of an individual located within the monitored site to an expected normal value to detect an abnormal physical characteristic of the individual.

Example 13 includes the subject matter of any of Examples 1-12, and wherein the physiological characteristic comprises at least one of a heart rate, a galvanic skin response, or a biochemical reaction.

Example 14 includes the subject matter of any of Examples 1-13, and wherein the threat assessment module is further to determine the presence of an active threat based on the threat assessment; and generate a threat response in response to a determination of an active threat.

Example 15 includes the subject matter of any of Examples 1-14, and wherein to generate the threat response comprises to (i) dispatch emergency resources to the monitored site, (ii) reroute traffic away from the monitored site, (iii) generate a notification of the active threat, or (iv) commence the monitoring of a different monitored site.

Example 16 includes the subject matter of any of Examples 1-15, and wherein the sensor data comprises behavioral sensor data from a behavioral sensor and physiological sensor data from a physiological sensor.

Example 17 includes the subject matter of any of Examples 1-16, and wherein at least one of the behavioral sensor or the physiological sensor is a stationary sensor located at the monitored site.

Example 18 includes the subject matter of any of Examples 1-17, and wherein the stationary sensor comprises at least one of a camera sensor, an audio sensor, a motion sensor, a communication sensor, or a chemical sensor.

Example 19 includes the subject matter of any of Examples 1-18, and, wherein at least one of the behavioral sensor or the physiological sensor is a personal sensor carried on the person of an individual located within the monitored site.

Example 20 includes the subject matter of any of Examples 1-19, and wherein the personal sensor a camera, a head-worn video device, a motion sensor, an audio sensor, a proximity sensor, a pedometer, a heart rate sensor, a galvanic skin response sensor, or a breathing sensor carried by the individual.

Example 21 includes a method for determining a threat assessment at a monitored site, the method comprising receiving sensor data from sensors of a sensor array located at the monitored site, the sensor data including behavioral sensor data indicative of a physical behavior of individuals within the monitored site and physiological sensor data indicative of physiological characteristics of individuals within the monitored site; analyzing the behavioral sensor data to generate behavioral analysis data; analyzing the physiological data of the sensor data to generate physiological analysis data; and determining a threat assessment for the monitored site based on the behavioral analysis data and the physiological analysis data.

Example 22 includes the subject matter of Example 21, and further including determining context data related to the monitored site, wherein determining the threat assessment comprises determining a threat assessment for the monitored site based on the behavioral analysis data, the physiological analysis data, and the context data.

Example 23 includes the subject matter of any of Examples 21 and 22, and wherein determining context data comprises determining context data related to a culture of the individuals located within the monitored site.

Example 24 includes the subject matter of any of Examples 21-23, and wherein determining context data comprises determining context data related to an event held at the monitored site, an activity performed at the monitored site, the time of day, or the time of year.

Example 25 includes the subject matter of any of Examples 21-24, and wherein determining context data comprises retrieving context data from a remote information system.

Example 26 includes the subject matter of any of Examples 21-25, and wherein analyzing the behavioral sensor data comprises analyzing the behavioral sensor data based on the context data to generate the behavioral analysis data.

Example 27 includes the subject matter of any of Examples 21-26, and wherein analyzing the physiological sensor data comprises analyzing the physiological sensor data based on the context data to generate the physiological analysis data.

Example 28 includes the subject matter of any of Examples 21-27, and wherein analyzing the behavioral sensor data comprises comparing a physical behavior of an individual located within the monitored site to other individuals located within the monitored site to detect abnormal physical behavior.

Example 29 includes the subject matter of any of Examples 21-28, and wherein to detect the abnormal physical behavior comprises to detect the wearing of abnormal clothing by the individual relative to the clothing worn by the other individuals located within the monitored site.

Example 30 includes the subject matter of any of Examples 21-29, and wherein to detect the abnormal physical behavior comprises to detect an abnormal physical proximity of the individual to another individual within the monitored site relative to proximities of other individuals with each other.

Example 31 includes the subject matter of any of Examples 21-30, and wherein to detect the abnormal physical behavior comprises to detect an abnormal movement of the individual relative to the movement of the other individuals located within the monitored site.

Example 32 includes the subject matter of any of Examples 21-31, and wherein analyzing the physiological sensor data comprises comparing a physiological characteristic of an individual located within the monitored site to an expected normal value to detect an abnormal physical characteristic of the individual.

Example 33 includes the subject matter of any of Examples 21-32, and wherein the physiological characteristic comprises at least one of a heart rate, a galvanic skin response, or a biochemical reaction.

Example 34 includes the subject matter of any of Examples 21-33, and further including determining the presence of an active threat based on the threat assessment; and generating a threat response in response to a determination of an active threat.

Example 35 includes the subject matter of any of Examples 21-34, and wherein generating the threat response comprises at least one of dispatch emergency resources to the monitored site, rerouting traffic away from the monitored site, generating a notification of the active threat, or commencing the monitoring of a different monitored site.

Example 36 includes the subject matter of any of Examples 21-35, and wherein receiving sensor data comprises receiving behavioral sensor data from a behavioral sensor and receiving physiological sensor data from a physiological sensor.

Example 37 includes the subject matter of any of Examples 21-36, and wherein at least one of the behavioral sensor or the physiological sensor is a stationary sensor located at the monitored site.

Example 38 includes the subject matter of any of Examples 21-37, and wherein the stationary sensor comprises at least one of a camera sensor, an audio sensor, a motion sensor, a communication sensor, or a chemical sensor.

Example 39 includes the subject matter of any of Examples 21-38, and wherein at least one of the behavioral sensor or the physiological sensor is a personal sensor carried on the person of an individual located within the monitored site.

Example 40 includes the subject matter of any of Examples 21-39, and wherein the personal sensor a camera, a head-worn video device, a motion sensor, an audio sensor, a proximity sensor, a pedometer, a heart rate sensor, a galvanic skin response sensor, or a breathing sensor carried by the individual.

Example 41 includes one or more computer-readable storage media comprising a plurality of instructions stored thereon that, in response to execution, cause a threat monitoring system to perform the method of any of Examples 21-40.

Example 42 includes a threat monitoring system for determining a threat assessment at a monitored site, the threat monitoring system comprising means for performing the method of any of Examples 21-40.

The invention claimed is:

1. A threat monitoring compute device comprising:
a communication circuit;
one or more processors; and
one or more memory devices that include a plurality of instructions that, when executed by the one or more processors, cause the threat monitoring compute device to:
receive, by the communication circuit, sensor data from one or more sensors of a sensor array located at the monitored site, wherein the sensor data is indicative of a level of fear presently felt by one or more individuals located within the monitored site and wherein the sensor data includes behavioral sensor data indicative of a physical behavior of a first individual of the one or more individuals;
analyze the sensor data based on context data related to the monitored site to determine whether a threat is presently occurring at the monitored site, wherein the analysis of the sensor data includes a comparison of a behavior of the first individual indicated by the behavioral sensor data to a behavior of the one or more individuals other than the first individual to determine whether the first individual is displaying abnormal behavior; and
analyze, in response to a determination that a threat is presently occurring at the monitored site and based on the sensor data, a cause of the threat.

2. The threat monitoring compute device of claim 1, wherein to:
analyze the sensor data comprises to analyze the behavior sensor data to determine whether the first individual is displaying abnormal behavior based on the context data.

3. The threat monitoring compute device of claim 1, wherein to:
receive the sensor data from the one or more sensors of the sensor array comprises to receive physiological sensor data indicative of a physiological characteristic of the first individual, and
analyze the sensor data comprises to analyze the physiological sensor data to determine whether the first individual is experiencing an abnormal physiological response based on the context data.

4. The threat monitoring compute device of claim 3, wherein to analyze the physiological sensor data comprises to compare a physiological response of the first individual indicated by the physiological sensor data to physiological responses of other individuals presently located in the monitored site.

5. The threat monitoring compute device of claim 1, wherein to analyze the sensor data comprises to:
analyze the sensor to determine an initial threat assessment for the monitored site,
modify the initial threat assessment based on the context data, and
determine whether a threat is presently occurring at the monitored site based on the modified initial threat assessment.

6. The threat monitoring compute device of claim 1, wherein to receive the sensor data comprises to receive sensor data from a personal compute device carried on the person of an individual located within the monitored site, and
wherein the plurality of instructions, when executed by the one or more processors, further cause the threat monitoring compute device to transmit an alert notification to the personal compute device in response to a determination that a threat is presently occurring at the monitored site.

7. The threat monitoring compute device of claim 1, wherein the context data defines an expected behavior or physiological response of individuals presently located within the monitored site.

8. A method comprising:
receiving, by the communication circuit of a threat monitoring compute device, sensor data from one or more sensors of a sensor array located at the monitored site, wherein the sensor data is indicative of a level of fear presently felt by one or more individuals located within the monitored site and wherein the sensor data includes behavioral sensor data indicative of a physical behavior of a first individual of the one or more individuals;
analyzing, by the threat monitoring compute device, the sensor data based on context data related to the monitored site to determine whether a threat is presently occurring at the monitored site, wherein the analysis of the sensor data includes a comparison of a behavior of the first individual indicated by the behavioral sensor data to a behavior of the one or more individuals other than the first individual to determine whether the first individual is displaying abnormal behavior; and
analyzing, in response to a determination that a threat is presently occurring at the monitored site and based on the sensor data, a cause of the threat.

9. The method of claim 8, wherein:
analyzing the sensor data comprises analyzing the behavior sensor data to determine whether the first individual is displaying abnormal behavior based on the context data.

10. The method of claim 8, wherein:
receiving the sensor data from the one or more sensors of the sensor array comprises receiving physiological sensor data indicative of a physiological characteristic of the first individual, and
analyzing the sensor data comprises analyzing the physiological sensor data to determine whether the first individual is experiencing an abnormal physiological response based on the context data.

11. The method of claim 10, wherein analyzing the physiological sensor data comprises comparing a physiological response of the first individual indicated by the physiological sensor data to physiological responses of other individuals presently located in the monitored site.

12. The method of claim 8, wherein analyzing the sensor data comprises:
analyzing the sensor to determine an initial threat assessment for the monitored site,
modifying the initial threat assessment based on the context data, and
determining whether a threat is presently occurring at the monitored site based on the modified initial threat assessment.

13. The method of claim 8, wherein receiving the sensor data comprises receiving sensor data from a personal compute device carried on the person of an individual located within the monitored site, and further comprising transmitting an alert notification to the personal compute device in response to a determination that a threat is presently occurring at the monitored site.

14. The method of claim 8, wherein the context data defines an expected behavior or physiological response of individuals presently located within the monitored site.

15. One or more non-transitory machine-readable storage media comprising a plurality of instructions stored thereon that, when executed, causes a threat monitoring compute device to:
   receive sensor data from one or more sensors of a sensor array located at the monitored site, wherein the sensor data is indicative of a level of fear presently felt by one or more individuals located within the monitored site and wherein the sensor data includes behavioral sensor data indicative of a physical behavior of a first individual of the one or more individuals;
   analyze the sensor data based on context data related to the monitored site to determine whether a threat is presently occurring at the monitored site, wherein the analysis of the sensor data includes a comparison of a behavior of the first individual indicated by the behavioral sensor data to a behavior of the one or more individuals other than the first individual to determine whether the first individual is displaying abnormal behavior; and
   analyze, in response to a determination that a threat is presently occurring at the monitored site and based on the sensor data, a cause of the threat.

16. The one or more non-transitory machine-readable storage media of claim 15, wherein:
   analyze the sensor data comprises to analyze the behavior sensor data to determine whether the first individual is displaying abnormal behavior based on the context data.

17. The one or more non-transitory machine-readable storage media of claim 15, wherein to:
   receive the sensor data from the one or more sensors of the sensor array comprises to receive physiological sensor data indicative of a physiological characteristic of the first individual, and
   analyze the sensor data comprises to analyze the physiological sensor data to determine whether the first individual is experiencing an abnormal physiological response based on the context data.

18. The one or more non-transitory machine-readable storage media of claim 17, wherein to analyze the physiological sensor data comprises to compare a physiological response of the first individual indicated by the physiological sensor data to physiological responses of other individuals presently located in the monitored site.

19. The one or more non-transitory machine-readable storage media of claim 15, wherein to analyze the sensor data comprises to:
   analyze the sensor to determine an initial threat assessment for the monitored site,
   modify the initial threat assessment based on the context data, and
   determine whether a threat is presently occurring at the monitored site based on the modified initial threat assessment.

20. The one or more non-transitory machine-readable storage media of claim 15, wherein to receive the sensor data comprises to receive sensor data from a personal compute device carried on the person of an individual located within the monitored site, and
   wherein the plurality of instructions, when executed by the one or more processors, further cause the threat monitoring compute device to transmit an alert notification to the personal compute device in response to a determination that a threat is presently occurring at the monitored site.

21. The one or more non-transitory machine-readable storage media of claim 15, wherein the context data defines an expected behavior or physiological response of individuals presently located within the monitored site.

* * * * *